United States Patent [19]

Takahashi

[11] Patent Number: 5,431,355
[45] Date of Patent: Jul. 11, 1995

[54] SPINNING REEL FOR FISHING

[75] Inventor: Hideaki Takahashi, Tokyo, Japan

[73] Assignee: Daiwa Seiko, Inc., Tokyo, Japan

[21] Appl. No.: 201,316

[22] Filed: Feb. 24, 1994

[30] Foreign Application Priority Data

Feb. 26, 1993 [JP] Japan .................... 5-061426

[51] Int. Cl.⁶ .......................................... A01K 89/027
[52] U.S. Cl. .................................................... 242/246
[58] Field of Search ............... 242/230, 241, 244, 246

[56] References Cited

U.S. PATENT DOCUMENTS

| | | | |
|---|---|---|---|
| 4,634,073 | 1/1987 | Coquelet | 242/245 |
| 4,696,437 | 9/1987 | Yoshikawa | 242/244 |
| 4,749,285 | 6/1988 | Noda | 242/244 |
| 4,756,487 | 7/1988 | Hayashi | 242/244 |
| 4,778,120 | 10/1988 | Finney et al. | 242/244 |
| 4,778,123 | 10/1988 | Yoshikawa | 242/244 |
| 5,040,743 | 8/1991 | Zurcher et al. | 242/246 |

*Primary Examiner*—Joseph J. Hail, III
*Attorney, Agent, or Firm*—Longacre & White

[57] ABSTRACT

The present disclosure concerns a drag control mechanism for spinning type fishing reels. An operating body for regulating brake force is provided, as in a conventional rear drag system, at the rear of a reel body, whereas a brake member is provided at a front portion of a spool. A support shaft and an operating shaft link manipulation of the operating body with the braking member to control the drag force produced by the braking member on the spool.

4 Claims, 5 Drawing Sheets

SPINNING REEL FOR FISHING

BACKGROUND OF THE INVENTION a) Field of the Invention

The invention concerns an improved drag control device provided in a spinning reel for fishing.

b) Description of Related Art

There are two commonly known drag systems for braking spools in spinning reels for fishing: a front drag system in which a brake mechanism is provided in a spool to regulate drag or braking force on the spool, and a rear drag system in which a brake mechanism is provided in a reel body so as to regulate drag force from within the reel body.

An advantage of the rear drag system over the front drag system is the ability to be manipulated quickly and readily, even while fishing. However, a disadvantage of the rear drag system is its size is generally restricted to a cylindrical housing at the rear of the reel body. Consequently, the available brake force is not as great as that in front drag systems.

SUMMARY OF THE INVENTION

An object of the present invention is to provide a drag control mechanism for spinning type fishing reels which is capable of producing brake forces more typical of conventional front drag systems than conventional rear drag systems, while maintaining the capability of the rear drag system to be readily manipulated during fishing.

To accomplish the above-noted and other objects, the present invention provides a spinning reel for fishing, which includes: a reel body having a front portion and a rear portion opposite from the front portion; a spool having a braking member therein, the spool being located at the front portion of the reel body; a support shaft for rotatably supporting the spool, the support shaft defining an axis and having a first end and a second end opposite from the first end; a pressure member for pressing the braking member against the spool to provide a braking force, the pressure member being located at the first end of the support shaft and movable along the axis in conjunction with rotation of the support shaft about the axis; an operating shaft coupled to the second end of the support shaft, the operating shaft being prevented from rotating relative to the support shaft about the axis and permitted to translate relative to the support shaft along the axis; and a manipulator for rotating the operating shaft, the manipulator being located at the rear portion of the reel body.

To reel in a fishing line, it is well known for a handle shaft to turn a rotor to wind the fishing line onto the spool. Simultaneously, the spool is reciprocated in the axial direction on the operating shaft of a slide member. When the drag force of the spool is to be regulated or controlled, the manipulator or operating body rotates the operating shaft. Rotation of the operating shaft is interlocked with a support shaft, thereby reciprocating the pressure member back and forth. Consequently, the force of the brake member against the spool is adjusted to a relatively weaker or stronger mode in proportion to the quantity of rotation of the pressure member.

DESCRIPTION OF THE PREFERRED EMBODIMENT

Figure 1:
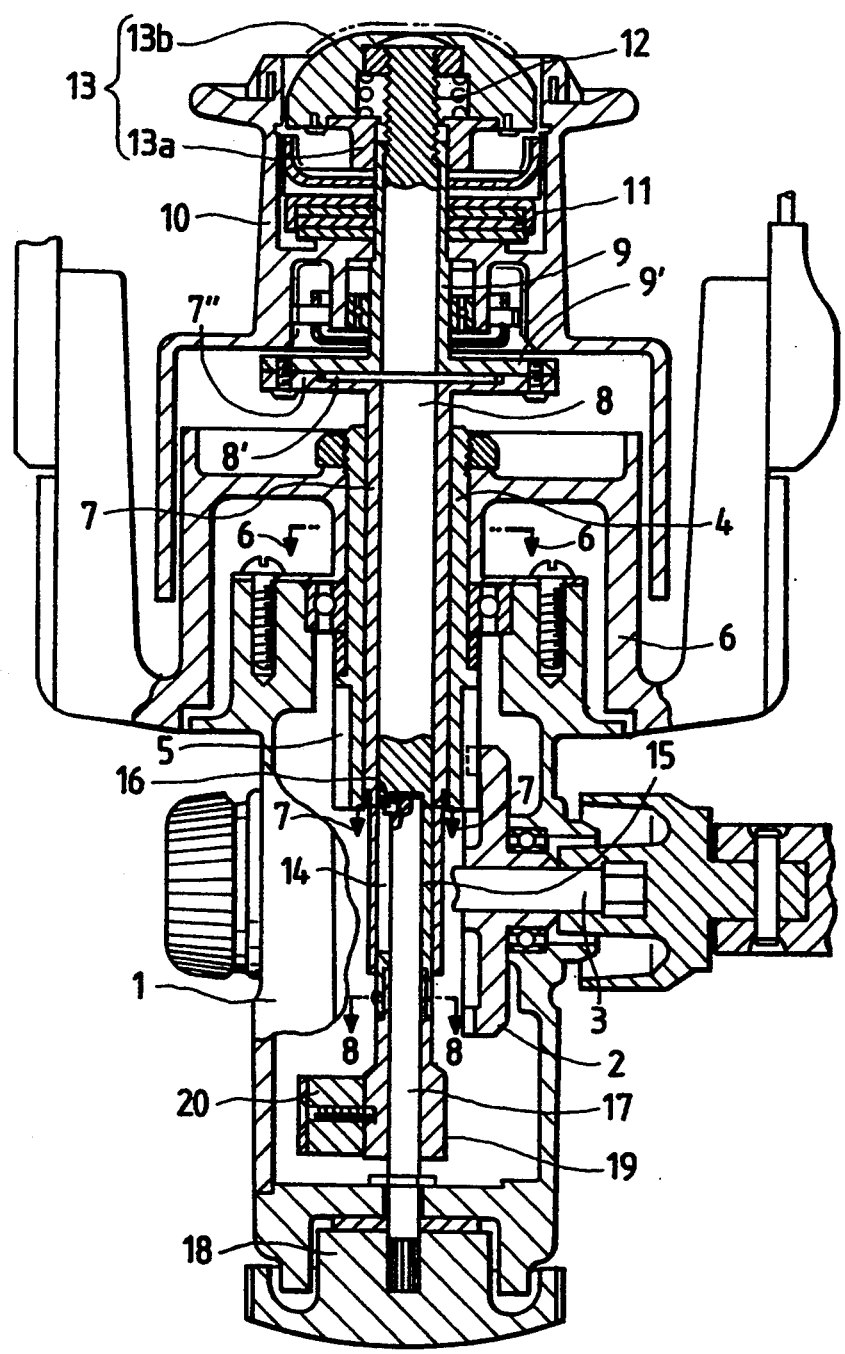
FIG. 1 is a longitudinal elevation view showing a spinning reel for fishing according to the present invention.
Figure 2:
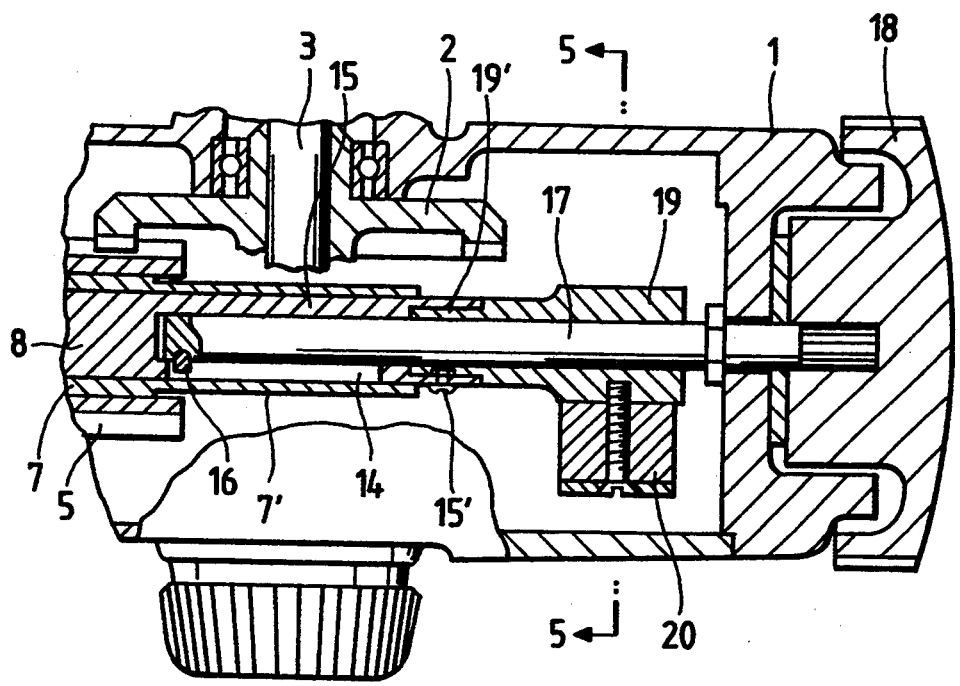
FIG. 2 is a longitudinal elevation view showing the principal parts of the present invention.
Figure 3:
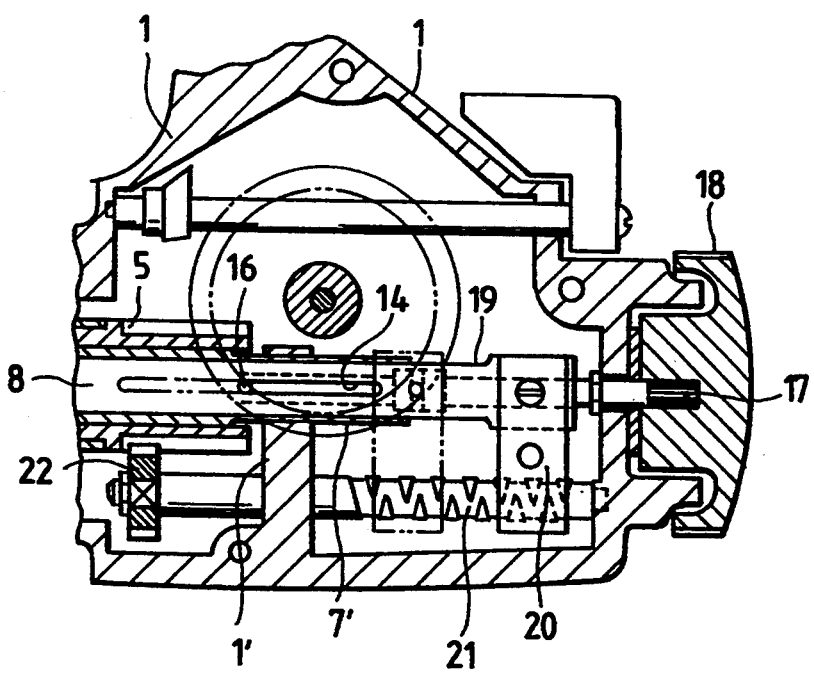
FIG. 3 is a longitudinal side view showing the principal parts of the spinning reel when the spool has been returned toward the spinning reel.
Figure 4:
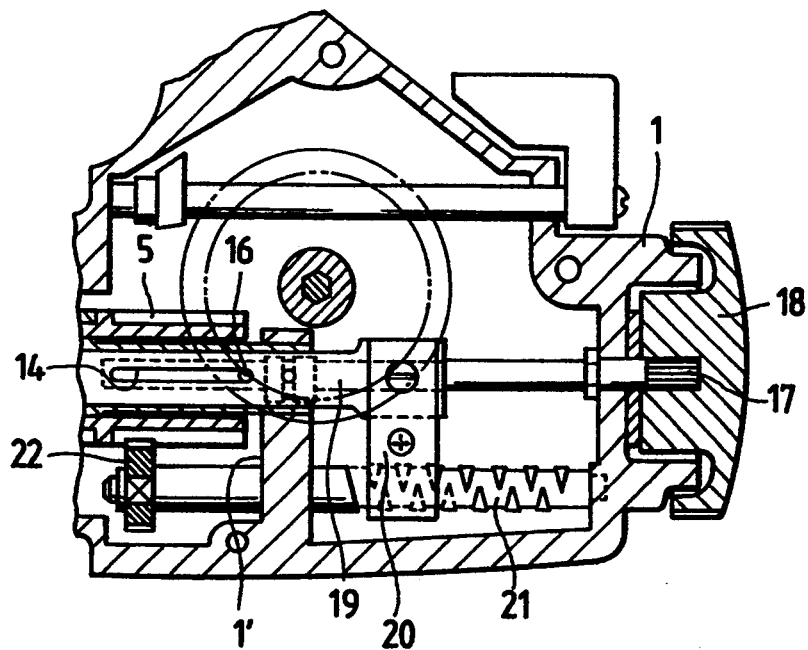
FIG. 4 is a longitudinal side view showing the principal parts of the spinning reel when the spool has been extended from the spinning reel.
Figure 5:
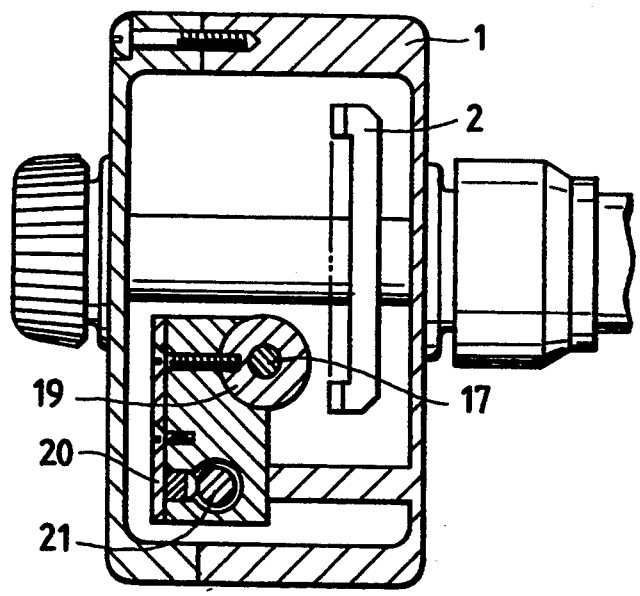
FIG. 5 is a sectional view taken along line 5—5 in FIG. 2.
Figure 6:
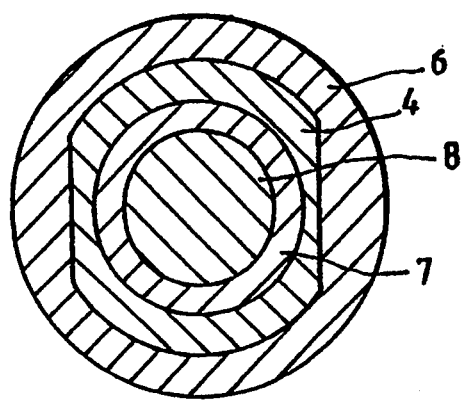
FIG. 6 is a sectional, view taken along line 6—6 in FIG. 1.
Figure 7:
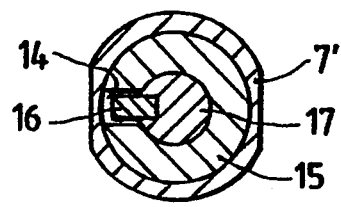
FIG. 7 is a sectional view taken along line 7—7 in FIG. 1.
Figure 8:
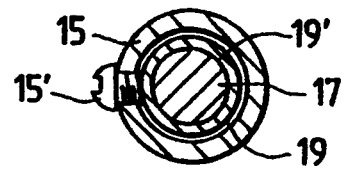
FIG. 8 is a sectional view taken along line 8—8 of FIG. 1.
Figure 9:
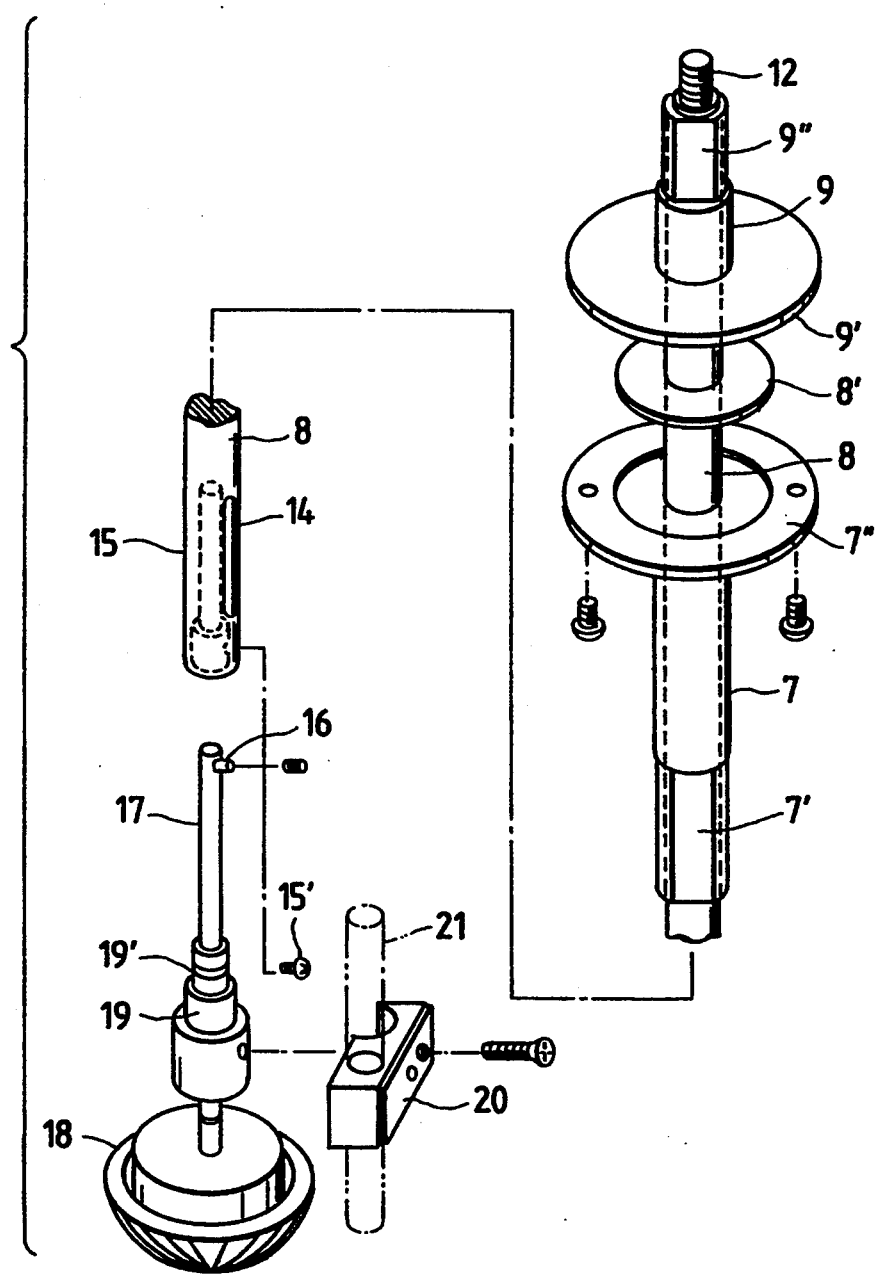
FIG. 9 is an exploded perspective view showing the principal parts of the present invention.

Referring to the accompanying drawings, an embodiment of the present invention will subsequently be described.

A reel body 1 rotatably supports a handle shaft 3 including a drive gear 2. A tubular shaft 4 rotatably supported at the front part of the reel body 1 includes a pinion 5 which meshes with the drive gear 2. This causes a rotor 6 secured to the tubular shaft 4 to rotate when the handle shaft 3 is turned, as is known in conventional spinning reels.

A support tube 7, having a collar plate 7" at its front end, passes through the tubular shaft 4. The support tube 7 is supported for relative translation, without relative rotation, by the cooperative engagement between support portion 1' of the reel body 1 and rotation preventive portion 7' of the support tube 7. In a known manner, a spool 10 is coupled for relative rotation with respect to a spool support tube 9. A brake member 11 for braking the spool 10 is fitted to an asymmetrical portion 9" formed at the front portion of the spool support tube 9.

A support shaft 8 is relatively rotatably supported within the support tube 7. A collar 8' is axially held between the collar plate 7" and a collar 9' installed at the rear of the spool support tube 9. A thread 12 is provided at the front end of the support shaft 8 and threadingly engages a pressure member 13 so that the pressure member 13 presses the brake member 11 against the spool 10.

The rear portion of the support shaft 8 is formed into a tubular portion 15 having a longitudinally extending slot 14. An operating shaft 17 having a pin 16 adapted to slide in the slot 14 is received in the tubular portion 15. The rear end of the operating shaft 17 protrudes from the reel body 1 and connects with an operating body 18 which serves to rotate the operating shaft 17. Further, the operating body 18 is also rotatably supported by the reel body 1.

A slide member 19 is coupled via a screw 15' received in an annular groove 19' near the rear end of the tubular portion 15. The slide member 19 is both relatively translatable and rotatable with respect to the periphery of the operating shaft 17. A slide 20 fixed to the slide member 19 is engaged with a traverse cam shaft 21. In a known manner, the traverse cam shaft 21 is rotated via the drive gear 2, the pinion 5 and a small gear 22 meshing with the pinion 5, such that as the handle shaft 3 is rotated, the slide member 19 is reciprocated. Reciprocation of the slide member 19 causes the support shaft 8, the spool support tube 9 and the spool 10 to reciprocate along their axis. Rotation about their axis is guided by the slot 14 and the pin 16.

The spinning reel thus constructed operates as follows:

When the handle shaft 3 is turned, the rotor 6 is rotated via the drive gear 2, the pinion 5 and the tubular shaft 4 to wind the fishline onto the spool 10. Simultaneously, the traverse cam shaft 21 is rotated via the drive gear 2, the pinion 5 and the small gear 22. This reciprocates the support shaft 8 via the slider 20 and slide member 19 with the slot 14 of the support shaft 8 being guided by the pin 16 of the operating shaft 17. Consequently, the rotor 6 can wind the fishline onto the reciprocating spool 10 in a desirable, uniform fashion.

To adjust a drag or braking force applied to the spool 10, the operating body 18 is rotated clockwise or counterclockwise to rotate the operating shaft 17. Since the operating shaft 17 is coupled to the support shaft 8 via the slot 14 and the pin 16, the support shaft 8 is rotated together with the operating shaft 17. Rotation of the support shaft 8 causes axial movement of the pressure member 13 along the support shaft 8 since the pressure member 13 is threadingly engaged with the support shaft 8. In the illustrated embodiment, the frictional resistance between a lower pressure member 13a, which is both relatively axially translatable and non-rotatable with respect to the asymmetrical portion 9", and an upper pressure member 13b, which is threadingly engages the thread 12, causes axial movement of the pressure member 13 due to the rotation of the support shaft 8. Thus, rotation of the operating body 18 can control the amount of pressing the pressure member 13 applies to the braking member 11, thereby adjusting or modifying the magnitude of the drag braking force. Additionally, the braking force can be adjusted by directly manipulating the upper pressure member 13b to rotate the pressure member 13 relative to the support shaft 8, as in a conventional front drag type spinning reel. In the illustrated embodiment, threaded engagement between the pressure member 13 and the support shaft 8 converts rotation of the support shaft 8 to translation of the pressure member 13. However, alternative arrangements such as a cam mechanism may be substituted for the threaded engagement.

Since the operating member 18 is provided at the rear of the reel body 1 to quickly and smoothly regulate drag during fishing, and the brake member 11 is provided in the front of the spool 10 so as not to limit the diameter of the brake member as in conventional rear drag systems, the present invention has the effect of not only improving, but also increasing the braking force while maintaining the advantages of rear drag systems.

What is claimed is:

1. A spinning reel for fishing, comprising:
   a reel body having a front portion and a rear portion opposite from said front portion;
   a spool having a braking member therein, said spool being located at said front portion of said reel body;
   a support shaft for rotatably supporting said spool, said support shaft defining an axis as well as having a first end and a second end opposite from said first end;
   a pressure member for pressing said braking member against said spool to provide a braking force, said pressure member being located at said first end of said support shaft and translatable along said axis in response to rotation of said support shaft about said axis;
   an operating shaft coupled to said second end of said support shaft, said operating shaft is both relatively non-rotatable and axially translatable with respect to said support shaft; and
   a manipulator for rotating said operating shaft, said manipulator being located at said rear portion of said reel body.

2. The spinning reel according to claim 1, further comprising:
   spool reciprocating means for reciprocating said spool along said axis, said reciprocating means having a slide member axially translatable along said operating shaft and connected to said second end of said support shaft.

3. The spinning reel according to claim 1, wherein said pressure member threadingly engages said first end of said support shaft.

4. The spinning reel according to claim 1, wherein said operating shaft and said support shaft are coupled to each other through a pin in a slot.

* * * * *